United States Patent
Bonne et al.

(10) Patent No.: US 11,607,989 B2
(45) Date of Patent: *Mar. 21, 2023

(54) ADAPTIVE HEADLAMP SYSTEM FOR VEHICLE

(71) Applicant: Lumileds LLC, San Jose, CA (US)

(72) Inventors: Ronald Johannes Bonne, Plainfield, IL (US); Jyoti Kiron Bhardwaj, Cupertino, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/338,362

(22) Filed: Jun. 3, 2021

(65) Prior Publication Data

US 2021/0291724 A1    Sep. 23, 2021

Related U.S. Application Data

(63) Continuation of application No. 16/456,844, filed on Jun. 28, 2019, now Pat. No. 11,091,087.

(Continued)

(30) Foreign Application Priority Data

Oct. 22, 2018   (EP) .................................... 18201763

(51) Int. Cl.
*B60Q 1/14*    (2006.01)
*H04L 12/40*   (2006.01)
(Continued)

(52) U.S. Cl.
CPC ......... *B60Q 1/1423* (2013.01); *B60Q 1/0023* (2013.01); *B60Q 1/143* (2013.01);
(Continued)

(58) Field of Classification Search
CPC .... B60Q 1/1423; B60Q 1/0023; B60Q 1/143; B60Q 2300/054; B60Q 2300/42;
(Continued)

(56) References Cited

U.S. PATENT DOCUMENTS 4,985,816 A    1/1991   Seko et al.
5,184,114 A    2/1993   Brown
(Continued)

FOREIGN PATENT DOCUMENTS

CN    1770943 A     5/2006
CN    204077513 U   1/2015
(Continued)

OTHER PUBLICATIONS

US 10,864,845 B2, 12/2020, Bonne et al. (withdrawn)
(Continued)

*Primary Examiner* — Wei (Victor) Y Chan
(74) *Attorney, Agent, or Firm* — Schwegman, Lundberg & Woessner, P.A.

(57) ABSTRACT

A vehicle headlamp system includes a vehicle supported power and control system including a data bus. A sensor module can be connected to the data bus to provide information related to environmental conditions or information relating to presence and position of other vehicles and pedestrians. A separate headlamp controller can be connected to the vehicle supported power and control system and the sensor module through the bus. The headlamp controller can include an image frame buffer that can refresh held images at greater than 30 Hz speed. An active LED pixel array can be connected to the headlamp controller to project light according to a pattern and intensity defined by the image held in the image frame buffer and a standby image buffer can be connected to the image frame buffer to hold a default image.

20 Claims, 5 Drawing Sheets

Related U.S. Application Data

(60) Provisional application No. 62/729,298, filed on Sep. 10, 2018.

(51) Int. Cl.

| | |
|---|---|
| *F21S 41/141* | (2018.01) |
| *H05B 45/10* | (2020.01) |
| *B60Q 1/00* | (2006.01) |
| *G06V 20/58* | (2022.01) |
| *F21W 102/13* | (2018.01) |
| *B60R 11/04* | (2006.01) |
| *B60R 16/023* | (2006.01) |

(52) U.S. Cl.
CPC .......... *F21S 41/141* (2018.01); *G06V 20/584* (2022.01); *H04L 12/40* (2013.01); *H05B 45/10* (2020.01); *B60Q 2300/054* (2013.01); *B60Q 2300/42* (2013.01); *B60R 11/04* (2013.01); *B60R 16/023* (2013.01); *F21W 2102/13* (2018.01); *H04L 2012/40273* (2013.01)

(58) Field of Classification Search
CPC . B60Q 1/1407; B60Q 2300/45; F21S 41/141; G06V 20/584; H04L 12/40; H04L 2012/40273; H04L 12/40013; H05B 45/10; H05B 45/20; H05B 45/44; H05B 47/18; B60R 11/04; B60R 16/023; F21W 2102/13; Y02B 20/40
See application file for complete search history.

(56) References Cited

U.S. PATENT DOCUMENTS

| | | | |
|---|---|---|---|
| 6,611,610 B1 | 8/2003 | Stam et al. | |
| 6,728,393 B2 | 4/2004 | Stam et al. | |
| 6,933,956 B2 | 8/2005 | Sato et al. | |
| 6,967,569 B2 | 11/2005 | Weber et al. | |
| 7,432,967 B2 | 10/2008 | Bechtel et al. | |
| 7,450,085 B2 | 11/2008 | Thielemans et al. | |
| 7,526,103 B2 | 4/2009 | Schofield et al. | |
| 7,542,861 B1 | 6/2009 | You et al. | |
| 9,318,069 B2 | 4/2016 | Nambi et al. | |
| 9,344,683 B1* | 5/2016 | Nemat-Nasser ..... H04N 9/8205 | |
| 9,487,123 B2 | 11/2016 | Mizuno et al. | |
| 9,732,926 B2 | 8/2017 | Hiratsuka et al. | |
| 9,849,827 B2 | 12/2017 | Uchida et al. | |
| 9,956,901 B2 | 5/2018 | Nakanishi et al. | |
| 10,148,938 B2 | 12/2018 | Nagasaki et al. | |
| 10,219,348 B1 | 2/2019 | Chung | |
| 10,317,034 B2 | 6/2019 | Tessnow et al. | |
| 10,651,357 B2 | 5/2020 | Andrews | |
| 2001/0026646 A1 | 10/2001 | Morita et al. | |
| 2002/0142504 A1 | 10/2002 | Feldman et al. | |
| 2002/0171617 A1 | 11/2002 | Fuller | |
| 2002/0186192 A1 | 12/2002 | Maruoka et al. | |
| 2003/0038983 A1 | 2/2003 | Tanabe et al. | |
| 2003/0058262 A1 | 3/2003 | Sato et al. | |
| 2003/0222893 A1 | 12/2003 | Koester et al. | |
| 2004/0095184 A1 | 5/2004 | Oka et al. | |
| 2004/0114379 A1 | 6/2004 | Miller et al. | |
| 2004/0119667 A1 | 6/2004 | Yang | |
| 2004/0129887 A1 | 7/2004 | Vydrin et al. | |
| 2004/0252874 A1 | 12/2004 | Yamazaki | |
| 2005/0029872 A1 | 2/2005 | Ehrman et al. | |
| 2006/0007059 A1 | 1/2006 | Bell | |
| 2006/0017688 A1 | 1/2006 | Hohmann et al. | |
| 2006/0237636 A1 | 10/2006 | Lyons et al. | |
| 2007/0242337 A1 | 10/2007 | Bradley | |
| 2008/0129206 A1 | 6/2008 | Stam et al. | |
| 2009/0040152 A1 | 2/2009 | Scheibe | |
| 2009/0040775 A1 | 2/2009 | Scheibe | |
| 2009/0322429 A1 | 12/2009 | Ivanov et al. | |
| 2010/0073358 A1 | 3/2010 | Ozaki | |
| 2010/0097525 A1 | 4/2010 | Mino | |
| 2010/0259182 A1 | 10/2010 | Man et al. | |
| 2010/0301777 A1 | 12/2010 | Kraemer | |
| 2011/0012891 A1 | 1/2011 | Cheng et al. | |
| 2011/0062872 A1 | 3/2011 | Jin et al. | |
| 2012/0286135 A1 | 11/2012 | Gong et al. | |
| 2012/0287144 A1 | 11/2012 | Gandhi et al. | |
| 2012/0306370 A1 | 12/2012 | Van De Ven et al. | |
| 2013/0082604 A1 | 4/2013 | Williams et al. | |
| 2014/0267329 A1 | 9/2014 | Lee et al. | |
| 2015/0138212 A1 | 5/2015 | Bae et al. | |
| 2015/0151671 A1 | 6/2015 | Refior et al. | |
| 2015/0186098 A1 | 7/2015 | Hall | |
| 2015/0204512 A1 | 7/2015 | Chen et al. | |
| 2016/0033102 A1 | 2/2016 | Hiratsuka et al. | |
| 2016/0081028 A1 | 3/2016 | Chang et al. | |
| 2016/0081148 A1 | 3/2016 | Liang et al. | |
| 2016/0104418 A1 | 4/2016 | Keum et al. | |
| 2016/0155406 A1 | 6/2016 | Lee | |
| 2016/0275919 A1 | 9/2016 | Lawrence et al. | |
| 2016/0302270 A1 | 10/2016 | Wang | |
| 2016/0335957 A1 | 11/2016 | Fu et al. | |
| 2016/0345392 A1 | 11/2016 | Scenini et al. | |
| 2017/0243532 A1 | 8/2017 | Huang et al. | |
| 2017/0253172 A1 | 9/2017 | Canonne et al. | |
| 2018/0074199 A1 | 3/2018 | Lin et al. | |
| 2018/0079352 A1 | 3/2018 | Dalal | |
| 2018/0336692 A1 | 11/2018 | Wendel et al. | |
| 2019/0013307 A1 | 1/2019 | Wu et al. | |
| 2019/0057643 A1 | 2/2019 | Bae et al. | |
| 2019/0132917 A1 | 5/2019 | Veenstra et al. | |
| 2019/0189879 A1 | 6/2019 | Tandon et al. | |
| 2020/0079278 A1 | 3/2020 | Bonne et al. | |
| 2020/0079280 A1 | 3/2020 | Bonne et al. | |
| 2020/0082503 A1 | 3/2020 | Bonne et al. | |
| 2020/0082749 A1 | 3/2020 | Bonne | |
| 2020/0084848 A1 | 3/2020 | Bonne et al. | |
| 2020/0084853 A1 | 3/2020 | Bonne et al. | |
| 2020/0084854 A1* | 3/2020 | Bonne .................. H05B 47/125 | |
| 2020/0084868 A1 | 3/2020 | Bonne | |
| 2020/0128640 A1 | 4/2020 | Van Voorst Vader | |
| 2022/0057060 A1* | 2/2022 | Droegeler ............... F21S 43/15 | |

FOREIGN PATENT DOCUMENTS

| | | |
|---|---|---|
| DE | 102015016375 A1 | 6/2017 |
| EP | 2626851 A2 | 8/2013 |
| GB | 2176042 A | 12/1986 |
| JP | 01-244934 A | 9/1989 |
| JP | 2002247614 A | 8/2002 |
| JP | 2005-126068 A | 5/2005 |
| JP | 2009-224191 A | 10/2009 |
| JP | 2016-034785 A | 3/2016 |
| JP | 2017-162805 A | 9/2017 |
| JP | 2017-212340 A | 11/2017 |
| KR | 101846329 B1 | 4/2018 |
| TW | 201110811 A | 3/2011 |
| TW | 202030105 A | 8/2020 |
| WO | WO-2008/053521 A1 | 5/2008 |
| WO | WO-2009140963 A1 | 11/2009 |
| WO | WO-2013066017 A1 | 5/2013 |
| WO | WO-2014062425 A1 | 4/2014 |
| WO | WO-2017/174491 A1 | 10/2017 |
| WO | WO-2020053716 A1 | 3/2020 |
| WO | WO-2020053717 A1 | 3/2020 |
| WO | WO-2020053718 A2 | 3/2020 |
| WO | WO-2020053719 A1 | 3/2020 |

OTHER PUBLICATIONS

US 10,893,585 B2, 01/2021, Bonne et al. (withdrawn)
"Korean Application Serial No. 10-2021-7010598, Notice of Preliminary Rejection dated Jun. 1, 2021", (w/ English Translation), 9 pgs.
"Korean Application Serial No. 10-2021-7013997, Notice of Preliminary Rejection dated Jun. 1, 2021", (w/ English Translation), 9 pgs.

(56) References Cited

OTHER PUBLICATIONS

"Chinese Application Serial No. 201980074045.4, Office Action dated Nov. 26, 2021", (w/ English Translation), 10 pgs.
"European Application Serial No. 19779597.4, Response filed Oct. 19, 2021 to Communication pursuant to Rules 161(1) and 162 EPC", 13 pgs.
"Japanese Application Serial No. 2021-513236, Written Opinion and Amendment filed Nov. 17, 2021 in response to Notification of Reasons for Refusal dated Sep. 14, 2021", (w/ English Translation), 7 pgs.
"U.S. Appl. No. 16/456,835, 312 Amendment filed Apr. 27, 2020", 3 pgs.
"U.S. Appl. No. 16/456,835, Corrected Notice of Allowability dated Apr. 7, 2020", 4 pgs.
"U.S. Appl. No. 16/456,835, Non Final Office Action dated Jun. 11, 2020", 9 pgs.
"U.S. Appl. No. 16/456,835, Notice of Allowance dated Jan. 22, 2021", 9 pgs.
"U.S. Appl. No. 16/456,835, Notice of Allowance dated Jan. 27, 2020", 9 pgs.
"U.S. Appl. No. 16/456,835, Notice of Allowance dated Oct. 8, 2020", 9 pgs.
"U.S. Appl. No. 16/456,835, Response filed Sep. 11, 2020 to Non Final Office Action dated Jun. 11, 2020", 9 pgs.
"U.S. Appl. No. 16/456,844, 312 Amendment filed May 4, 2021", 5 pgs.
"U.S. Appl. No. 16/456,844, Corrected Notice of Allowability dated Sep. 18, 2020", 2 pgs.
"U.S. Appl. No. 16/456,844, Corrected Notice of Allowability dated Oct. 26, 2020", 2 pgs.
"U.S. Appl. No. 16/456,844, Corrected Notice of Allowability dated Oct. 28, 2020", 2 pgs.
"U.S. Appl. No. 16/456,844, Corrected Notice of Allowability dated Nov. 10, 2020", 2 pgs.
"U.S. Appl. No. 16/456,844, Corrected Notice of Allowability dated Nov. 19, 2020", 2 pgs.
"U.S. Appl. No. 16/456,844, Non Final Office Action dated Feb. 5, 2020", 8 pgs.
"U.S. Appl. No. 16/456,844, Notice of Allowance dated Feb. 18, 2021", 5 pgs.
"U.S. Appl. No. 16/456,844, Notice of Allowance dated Aug. 6, 2020", 5 pgs.
"U.S. Appl. No. 16/456,844, Response filed May 5, 20 to Non Final Office Action dated Feb. 5, 2020", 10 pgs.
"U.S. Appl. No. 16/456,849, Non Final Office Action dated Oct. 29, 2020", 11 pgs.
"U.S. Appl. No. 16/456,858, Corrected Notice of Allowability dated Nov. 12, 2020", 2 pgs.
"U.S. Appl. No. 16/456,858, Non Final Office Action dated Feb. 20, 2020", 11 pgs.
"U.S. Appl. No. 16/456,858, Notice of Allowance dated Aug. 28, 2020", 6 pgs.
"U.S. Appl. No. 16/456,858, Response filed May 20, 20 to Non Final Office Action dated Feb. 20, 2020", 8 pgs.
"U.S. Appl. No. 16/456,862, Examiner Interview Summary dated Oct. 16, 2020", 3 pgs.
"U.S. Appl. No. 16/456,862, Final Office Action dated Sep. 14, 2020", 15 pgs.
"U.S. Appl. No. 16/456,862, Non Final Office Action dated Mar. 6, 2020", 15 pgs.
"U.S. Appl. No. 16/456,862, Response filed Jun. 8, 20 to Non Final Office Action dated Mar. 6, 2020", 8 pgs.
"U.S. Appl. No. 16/456,862, Response filed Nov. 13, 2020 to Final Office Action dated Sep. 14, 2020", 10 pgs.
"U.S. Appl. No. 16/456,868, Final Office Action dated Oct. 15, 2020", 12 pgs.
"U.S. Appl. No. 16/456,868, Non Final Office Action dated Apr. 1, 2020", 9 pgs.
"U.S. Appl. No. 16/456,868, Response filed Jul. 1, 2020 to Non Final Office Action dated Apr. 1, 2020", 7 pgs.
"U.S. Appl. No. 16/456,874, Non Final Office Action dated Aug. 5, 2020", 7 pgs.
"European Application Serial No. 18201763.2, European Search Report dated Feb. 8, 2019", 1 pg.
"European Application Serial No. 18201763.2, European Search Report dated Feb. 15, 2019", 8 pgs.
"European Application Serial No. 18202319.2, Extended European Search Report dated Feb. 12, 2019", 10 pgs.
"European Application Serial No. 18203445.4, Partial European Search Report dated Apr. 12, 2019", 14 pgs.
"International Application Serial No. PCT/IB2019/057504, International Search Report dated Nov. 11, 2019", 3 pgs.
"International Application Serial No. PCT/IB2019/057504, International Search Report dated Nov. 18, 2019", 3 pgs.
"International Application Serial No. PCT/IB2019/057504, Written Opinion dated Nov. 11, 2019", 5 pgs.
"International Application Serial No. PCT/IB2019/057504, Written Opinion dated Nov. 18, 2019", 5 pgs.
"International Application Serial No. PCT/IB2019/057506, International Search Report dated Oct. 31, 2019", 4 pgs.
"International Application Serial No. PCT/IB2019/057506, Written Opinion dated Oct. 31, 2019", 10 pgs.
"International Application Serial No. PCT/IB2019/057507, International Search Report dated Apr. 24, 2020", 6 pgs.
"International Application Serial No. PCT/IB2019/057507, Written Opinion dated Apr. 24, 2020", 24 pgs.
"International Application Serial No. PCT/IB2019/057508, International Search Report dated Nov. 12, 2019", 4 pgs.
"International Application Serial No. PCT/IB2019/057508, Written Opinion dated Nov. 12, 2019", 10 pgs.
"Taiwanese Application Serial No. 108123755, Amendment filed Aug. 14, 20 in response to Office Action dated May 13, 2020", (w/ English Translation), 30 pgs.
"Taiwanese Application Serial No. 108123755, Notice mailed Aug. 26, 2020", (w/ English Translation), 6 pgs.
"Taiwanese Application Serial No. 108123755, Office Action dated May 13, 2020", 11 pgs.
"Taiwanese Application Serial No. 108123756, Office Action dated May 25, 2020", 29 pgs.
"Taiwanese Application Serial No. 108123758, Amendment filed Sep. 29, 2020 in response to Office Action dated Jun. 29, 2020", (w/ English Translation), 31 pgs.
"Taiwanese Application Serial No. 108123758, Office Action dated Jun. 29, 2020".
"Taiwanese Application Serial No. 108123758, Office Action dated Jun. 29, 2020", (w/ English Translation), 11 pgs.
Bonne, Ronald Johannes, "U.S. Appl. No. 62/941,123, filed Nov. 27, 2019".
Quint, Van Voorst Vader, et al., "U.S. Appl. No. 16/657,475, filed Oct. 18, 2019".
Song, Zhi Hua, et al., "U.S. Appl. No. 62/938,479, filed Nov. 21, 2019".
Song, Zhi Hua, "U.S. Appl. No. 62/938,527, filed Nov. 21, 2019".
Song, Zhi Hua, et al., "Adaptive Pulse Width Modulation With Phase Shift for Micro-Light-Emitting Diode", U.S. Appl. No. 62/951,199, filed Dec. 20, 2019, 47 pgs.
Toni, Lopez, "U.S. Appl. No. 62/890,853, filed Aug. 23, 2019".
Zhi, Hua, et al., "LED Pulse Width Modulation With Active Turn-Off", U.S. Appl. No. 62/888,246, filed Aug. 16, 2019, 16 pgs.
"Japanese Application Serial No. 2021-513236, Office Action dated Sep. 14, 2021", (w/ English Translation), 4 pgs.
"Korean Application Serial No. 10-2021-7010598, Notice of Grant of Patent dated Sep. 1, 2021", (w/ English Translation), 4 pgs.
"Korean Application Serial No. 10-2021-7010598, Response filed Aug. 2, 2021 to Notice of Preliminary Rejection dated Jun. 1, 2021", (w/ English Translation), 9 pgs.
"Korean Application Serial No. 10-2021-/013997, Notice of Grant of Patent dated Sep. 1, 2021", (w/ English Translation), 4 pgs.
"Korean Application Serial No. 10-2021-7013997, Response filed Aug. 2, 2021 to Notice of Preliminary Rejection dated Jun. 1, 2021", (w/ English Translation), 11 pgs.
U.S. Appl. No. 16/456,835, U.S. Pat. No. 11/034,286, filed Jun. 28, 2019, Adaptive Headlamp System for Vehicles.

(56) References Cited

OTHER PUBLICATIONS

U.S. Appl. No. 16/456,844, filed Jun. 28, 2019, Adaptive Headlamp System for Vehicle.

"Chinese Application Serial No. 201980074045.4, Response filed Apr. 2, 2022 to Office Action dated Nov. 26, 2021", (w/ English Translation of Claims), 23 pgs.

"European Application Serial No. 19779597.4, Communication Pursuant to Article 94(3) EPC dated Aug. 5, 2022", 6 pgs.

"Japanese Application Serial No. 2021-082190, Notice mailed Aug. 2, 2022", (w/ English Translation), 42 pgs.

"European Application Serial No. 19779597.4, Response filed Dec. 15, 2022 to Communication Pursuant to Article 94(3) EPC dated Aug. 5, 2022", 22 pgs.

* cited by examiner

ADAPTIVE HEADLAMP SYSTEM FOR VEHICLE

CROSS REFERENCE TO RELAYED APPLICATIONS

This application claims benefit of priority to European Patent Application No. 18201763.2 filed Oct. 22, 2018 and to U.S. Provisional Patent Application No. 62/729,298 filed Sep. 10, 2018, each of which is incorporated herein by reference in its entirety.

TECHNICAL FIELD

The present disclosure relates generally to a system providing dynamic lighting control for vehicle headlamps. In certain embodiments, the system can be LED pixel array able to provide an intensity and spatially modulated light projection suitable for adaptive driving beam systems.

BACKGROUND

A night-time vehicle driver may use a low directed headlight beam pattern to prevent drivers of oncoming vehicles from being dazzled or subjected to safety impairing glare, while switching to a high directed beam with greater range for improved roadway illumination when oncoming vehicles are not present. However, a driver of the vehicle can inadvertently drive with the high directed beam pattern if they fail to see an oncoming vehicle. Fortunately, widespread availability of sensor technologies for driver assist or autonomous operation have also enabled systems that provide active control of vehicle headlamp road illumination. Instead of relying on a fixed or user controlled illumination pattern, a headlight beam can be automatically dimmed or redirected based on inputs from the vehicle and/or its surroundings. For example, oncoming vehicles can be identified, and a portion of the headlight beam redirected to limit potential glare. As another example, pedestrian detection or location positioning systems can be used to identify areas likely to have pedestrians, and headlight beams redirected to illuminate pedestrian activity. Such adaptive driving beam (ADB) systems have been developed using mechanical shields, LEDs, digital micromirrors, and LCD shuttering systems.

Unfortunately, supporting large active arrays of LEDs or other light emitter/redirection systems (e.g. digital micromirrors or scanning lasers) can be difficult. Individual light intensity of thousands of pixels may need to be controlled at refresh rates of 30-60 Hz. Systems able to reliably handle such data rates are needed.

SUMMARY

In one embodiment, a vehicle headlamp system includes a vehicle supported power and control system including a data bus. A sensor module can be connected to the data bus to provide information related to environmental conditions (e.g. time of day or weather conditions) or information relating to presence and position of other vehicles and pedestrians. A separate headlamp controller can be connected to the vehicle supported power and control system and the sensor module through the bus. The headlamp controller can include an image frame buffer that can refresh held images at greater than 30 Hz speed. An active LED pixel array can be connected to the headlamp controller to project light according to a pattern and intensity defined by the image held in the image frame buffer and a standby image buffer can be connected to the image frame buffer to hold a default image.

In one embodiment, the vehicle supported power and control system provides image data to the headlamp controller. Alternatively, images can be generated by the headlamp controller in response to data received from the vehicle supported power and control system. In operation, the LED pixel array can be directed to reduce light emitted toward an oncoming vehicle.

In some embodiments, each pixel in the LED pixel array is addressable, while in other embodiments, fixed pixel groupings (e.g. 5×5 pixel blocks) are addressable. The aspect ratio of the LED pixel array can be selectable. In some embodiments the LED pixel array is positioned adjacent to static LED lighting.

In some embodiments the frame buffer is connected to the active LED pixel array through a pulse width modulator. To be able to timely respond to changes in lighting requirements for vehicles moving at highway speeds, the image frame buffer can refresh held images at 60 Hz or greater speed.

In another embodiment, a headlamp controller (suitable for working in conjunction with a vehicles power and sensor system) can include an image frame buffer that can refresh held images at greater than 30 Hz speed. The headlamp controller can be connected to an active LED pixel array with individually addressable pixels connected to the headlamp controller to project light according to a pattern and intensity defined by the image held in the image frame buffer. In some embodiment a standby image buffer can be connected to the image frame buffer to hold a default image.

In another embodiment, a headlamp control system includes a headlamp controller connectable to a vehicle supported power, sensor, and control system through a data bus, the headlamp controller having an image frame buffer that can refresh held images at greater than 30 Hz speed. An active LED pixel array connected to the headlamp controller can be used to project light according to a pattern and intensity defined by the image held in the image frame buffer. A standby image buffer can be connected to the image frame buffer to hold a default image. Image patterns can be provided in response to sensor information from the vehicle supported power, sensor, and control system, or alternatively or in addition, at least in part in response to local sensor information.

In another embodiment a vehicle headlamp system includes a headlamp controller having an image frame buffer that can refresh held images at greater than 30 Hz speed with images to the image frame buffer being provided by at least one of a vehicle supported power, sensor, and control system through a vehicle data bus and a local image creation module through a local data connection. An active LED pixel array with individually addressable pixels connected to the headlamp controller can be used to project light according to a pattern and intensity defined by the image held in the image frame buffer. Image patterns can be provided in response to sensor information from the vehicle supported power, sensor, and control system, or alternatively or in addition, at least in part in response to local sensor information.

DETAILED DESCRIPTION

Figure 1:
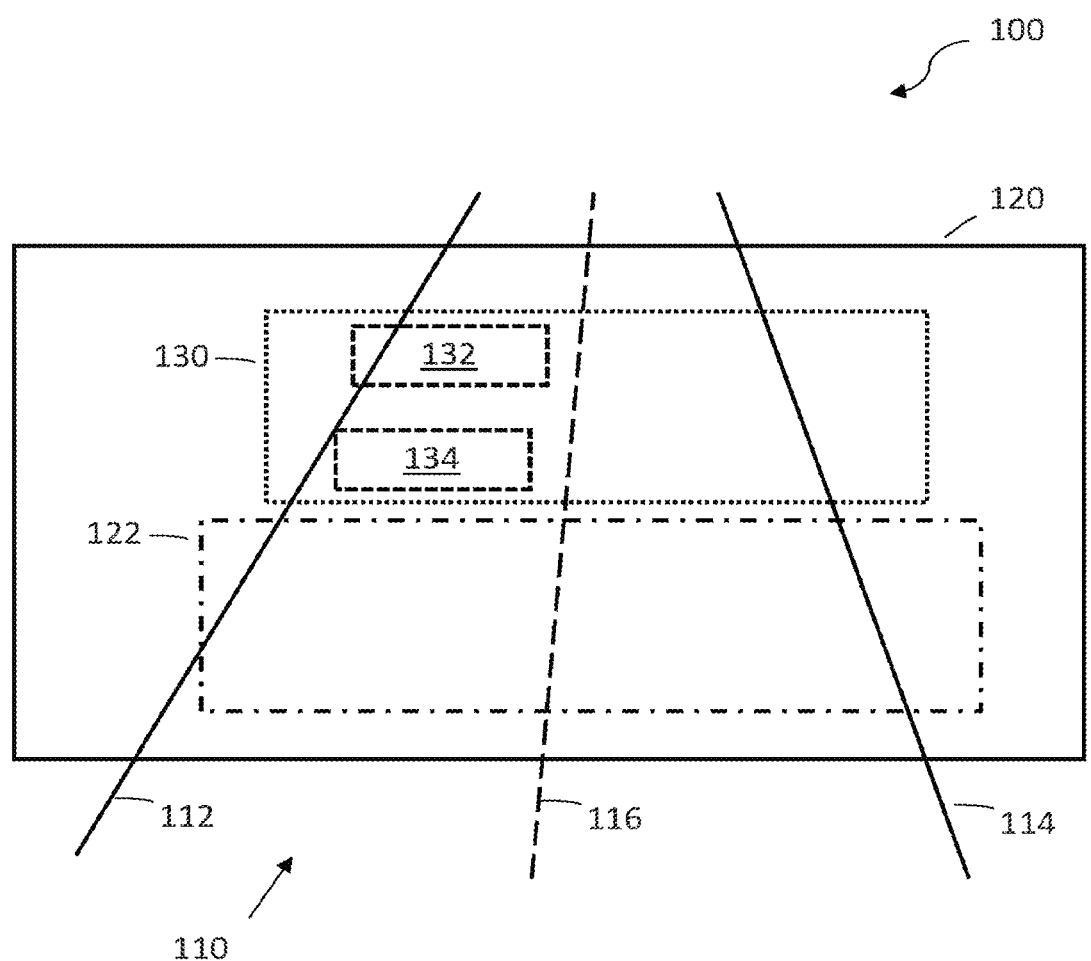
FIG. 1 is a diagram illustrating illumination of a road in discrete sectors using an active headlamp.

Light emitting pixel arrays may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting array may be used to mimic various street light types, allowing, for example, switching between a Type I linear street light and a Type IV semicircular street light by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

One high value application for light emitting arrays is illustrated with respect to FIG. 1, which shows potential roadway illumination pattern 100 for a vehicle headlamp system illuminating a region 120 in front of a vehicle. As illustrated, a roadway 110 includes a left edge 112, a right edge 114, and a centerline 116. In this example, two major regions are illuminated—a downward directed statically illuminated region 122 and a dynamically illuminated region 130. Light intensity within region 130 can be dynamically controlled. For example, as an oncoming vehicle (not shown) traveling between centerline 116 and left edge 112 moves into a subregion 132, light intensity can be reduced or shut off completely. As the oncoming vehicle moves toward subregion 134, a series of subregions (not shown) can be defined to also have reduced light intensity, reducing the chance of unsafe dazzle or glare. As will be appreciated, in other embodiments, light intensity can be increased to accentuate road signs or pedestrians, or spatial illumination patterns adjusted to allow, for example, dynamic light tracking of curved roadways.

Figure 2:
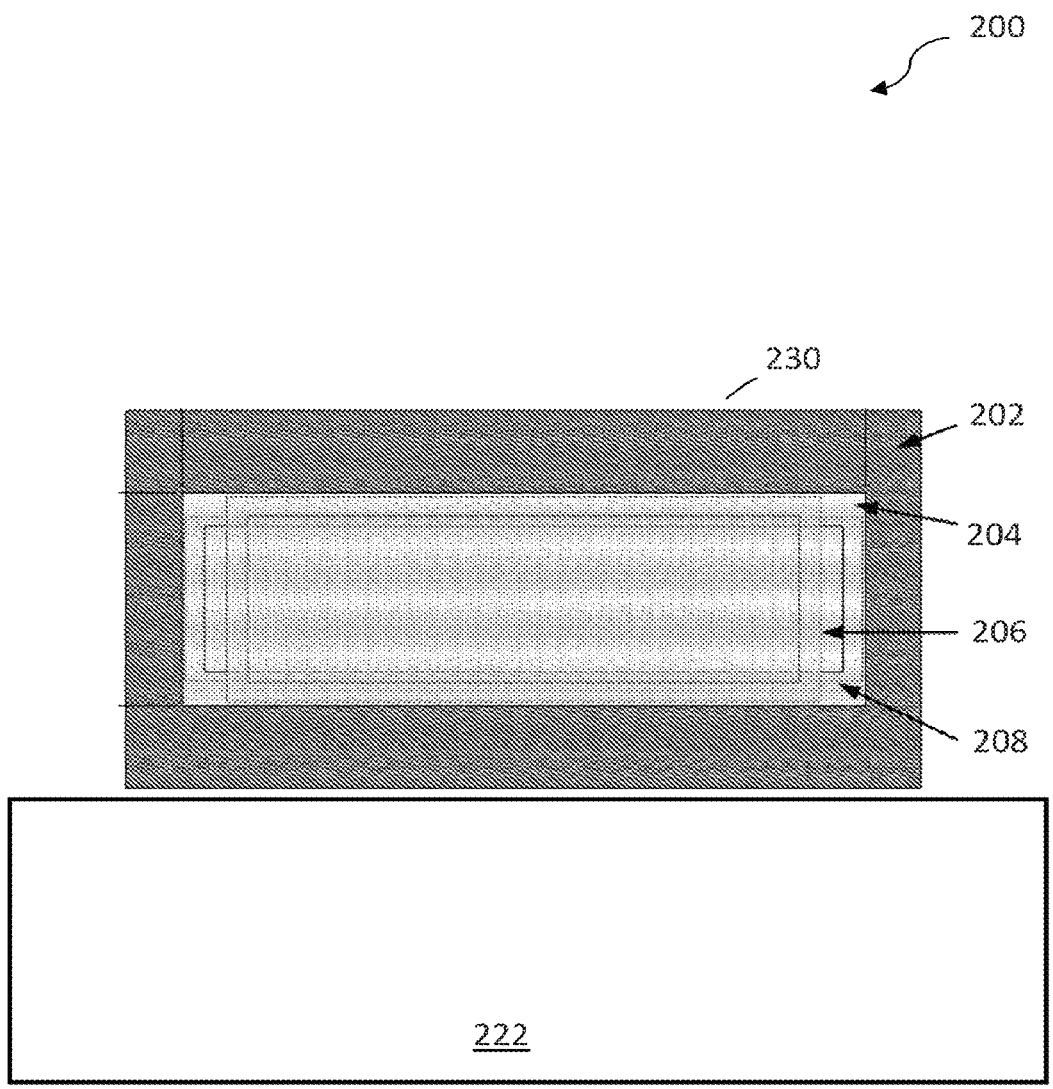
FIG. 2 illustrates a dynamic pixel addressable lighting module positioned adjacent to a static lighting module.

FIG. 2 illustrates a positioning of lighting modules 200 able to provide a lighting pattern such as discussed with respect to FIG. 1. An LED light module 222 can include LEDS, alone or in conjunction with primary or secondary optics, including lenses or reflectors. To reduce overall data management requirements, the light module 222 can be limited to on/off functionality or switching between relatively few light intensity levels. Pixel level control of light intensity is not necessarily supported.

Positioned adjacent to LED light module 22 is an active LED array 230. The LED array includes a CMOS die 202, with a pixel area 204 and alternatively selectable LED areas 206 and 208. The pixel area 204 can have 104 rows and 304 columns, for a total of 31,616 pixels distributed over an area of 12.2 by 4.16 millimeters. The selectable LED areas 206 and 208 allow for differing aspect ratios suitable for different vehicle headlamps or applications to be selected. For example, in one embodiment selectable LED area 206 can have a 1:3 aspect ratio with 82 rows and 246 columns, for a total of 20,172 pixels distributed over an area of 10.6 by 4 millimeters. Alternatively, selectable LED area 208 can have a 1:4 aspect ratio with 71 rows and 284 columns, for a total of 20,164 pixels distributed over an area of 12.1 by 3.2 millimeters. In one embodiment, pixels can be actively managed to have a 10-bit intensity range and a refresh rate of between 30 and 100 Hz, with a typical operational refresh rate of 60 Hz or greater.

Figure 3A:
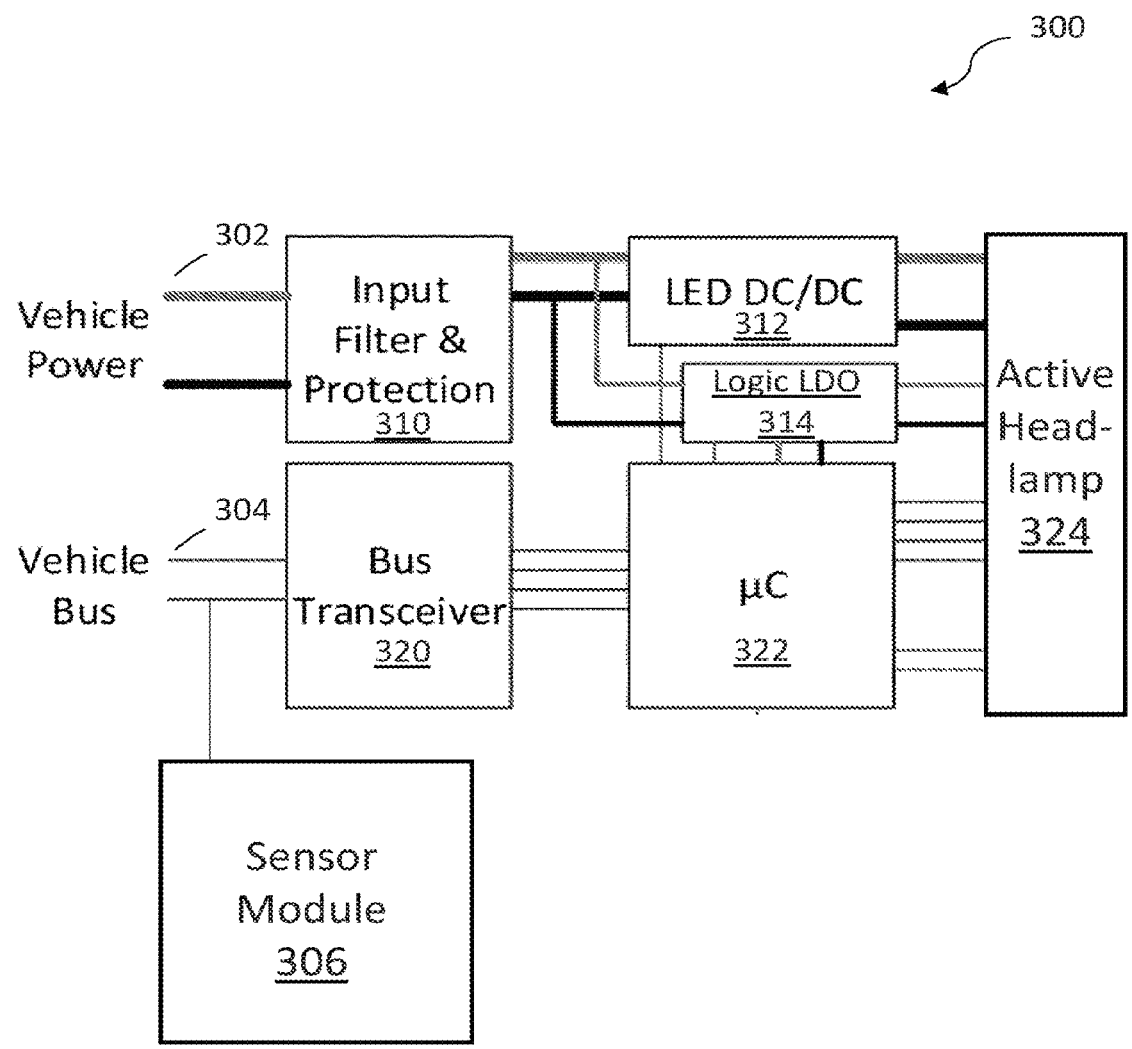
FIG. 3A is one embodiment of a vehicle headlamp system for controlling an active headlamp.

FIG. 3A illustrates an embodiment of a vehicle headlamp system 300 including a vehicle supported power (302) and control system including a data bus (304). A sensor module 306 can be connected to the data bus 304 to provide data related to environment conditions (e.g. time of day, rain, fog, ambient light levels, etc), vehicle condition (parked, in-motion, speed, direction), or presence/position of other vehicles or pedestrians. A separate headlamp controller 330 can be connected to the vehicle supported power and control system.

The vehicle headlamp system 300 can include a power input filter and control module 310. The module 310 can support various filters to reduce conducted emissions and provide power immunity. Electrostatic discharge (ESD) protection, load-dump protection, alternator field decay protection, and reverse polarity protection can also be provided by module 310.

Filtered power can be provided to a LED DC/DC module 312. Module 312 can be used only for powering LEDs, and typically has an input voltage of between 7 and 18 volts, with a nominal 13.2 volts. Output voltage can be set to be slightly higher (e.g. 0.3 volts) than LED array max voltage as determined by factory or local calibration, and operating condition adjustments due to load, temperature or other factors.

Filtered power is also provided to a logic LDO module 314 that can be used to power microcontroller 322 or CMOS logic in the active headlamp 330.

The vehicle headlamp system 300 can also include a bus transceiver 320 (e.g. with a UART or SPI interface) connected to microcontroller 322. The microcontroller 322 can translate vehicle input based on or including data from the sensor module 306. The translated vehicle input can include a video signal that is transferrable to an image buffer in the active headlamp module 324. In addition, the microcontroller 322 can load default image frames and test for open/short pixels during startup. In one embodiment, a SPI Interface loads an image buffer in CMOS. Image frames can be full frame, differential or partial. Other microcontroller 322 features can include control interface monitors of CMOS status, including die temperature, as well as logic LDO output. In some embodiments, LED DC/DC output can be dynamically controlled to minimize headroom. In addition to providing image frame data, other headlamp functions such as complementary use in conjunction with side marker or turn signal lights, and/or activation of daytime running lights can also be controlled.

Figure 3B:
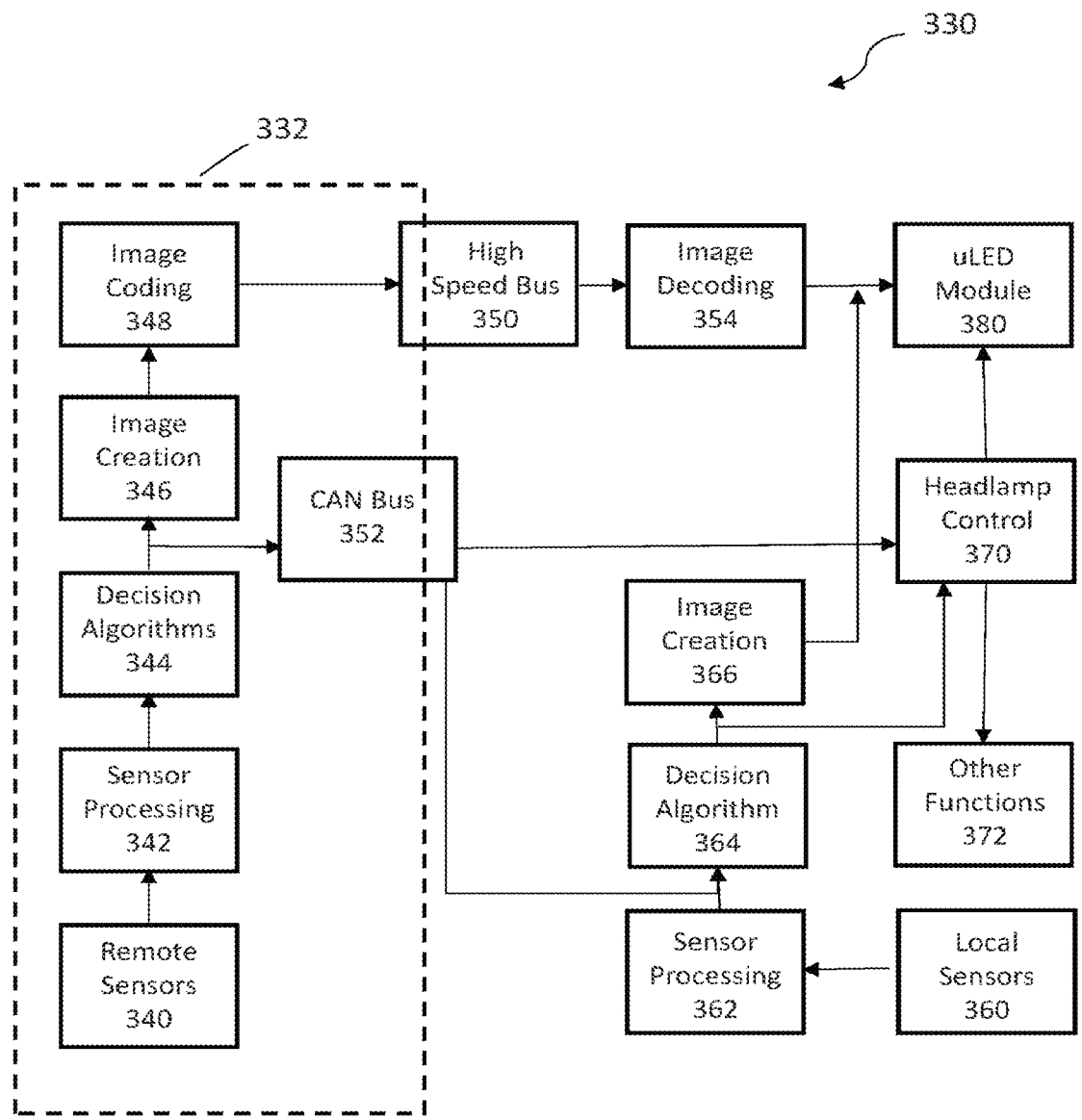
FIG. 3B is one embodiment of a vehicle headlamp system for controlling an active headlamp with connections to vehicle processing output.

FIG. 3B illustrates one embodiment of various components and modules of a vehicle headlamp system 330 capable of accepting vehicle sensor inputs and commands, as well as commands based on headlamp or locally mounted sensors. As seen in FIG. 3B, vehicle mounted systems can include remote sensors 340 and electronic processing modules capable of sensor processing 342. Processed sensor data can be input to various decision algorithms in a decision algorithm module 344 that result in command instructions or pattern creation based at least in part on various sensor input conditions, for example, such as ambient light levels, time of day, vehicle location, location of other vehicles, road conditions, or weather conditions. As will be appreciated, useful information for the decision algorithm module 344 can be provided from other sources as well, including connections to user smartphones, vehicle to vehicle wireless connections, or connection to remote data or information resources.

Based on the results of the decision algorithm module 344, image creation module 346 provides an image pattern that will ultimately provide an active illumination pattern to the vehicle headlamp that is dynamically adjustable and suitable for conditions. This created image pattern can be encoded for serial or other transmission scheme by image coding module 348 and sent over a high speed bus 350 to an image decoding module 354. Once decoded, the image pattern is provided to the uLED module 380 to drive activation and intensity of illumination pixels.

In some operational modes, the system 330 can be driven with default or simplified image patterns using instructions provided to a headlamp control module 370 via connection of the decision algorithm module 344 through a CAN bus 352. For example, an initial pattern on vehicle start may be a uniform, low light intensity pattern. In some embodiments, the headlamp control module can be used to drive other functions, including sensor activation or control.

In other possible operational modes, the system 330 can be driven with image patterns derived from local sensors or commands not requiring input via the CAN bus 352 or high speed bus 350. For example, local sensors 360 and electronic processing modules capable of sensor processing 362 can be used. Processed sensor data can be input to various decision algorithms in a decision algorithm module 364 that result in command instructions or pattern creation based at least in part on various sensor input conditions, for example, such as ambient light levels, time of day, vehicle location, location of other vehicles, road conditions, or weather conditions. As will be appreciated, like vehicle supported remote sensors 340, useful information for the decision algorithm module 364 can be provided from other sources as well, including connections to user smartphones, vehicle to vehicle wireless connections, or connection to remote data or information resources.

Based on the results of the decision algorithm module 364, image creation module 366 provides an image pattern that will ultimately provide an active illumination pattern to the vehicle headlamp that is dynamically adjustable and suitable for conditions. In some embodiments, this created image pattern does not require additional image coding/decoding steps but can be directly sent to the uLED module 380 to drive illumination of selected pixels.

Figure 4:
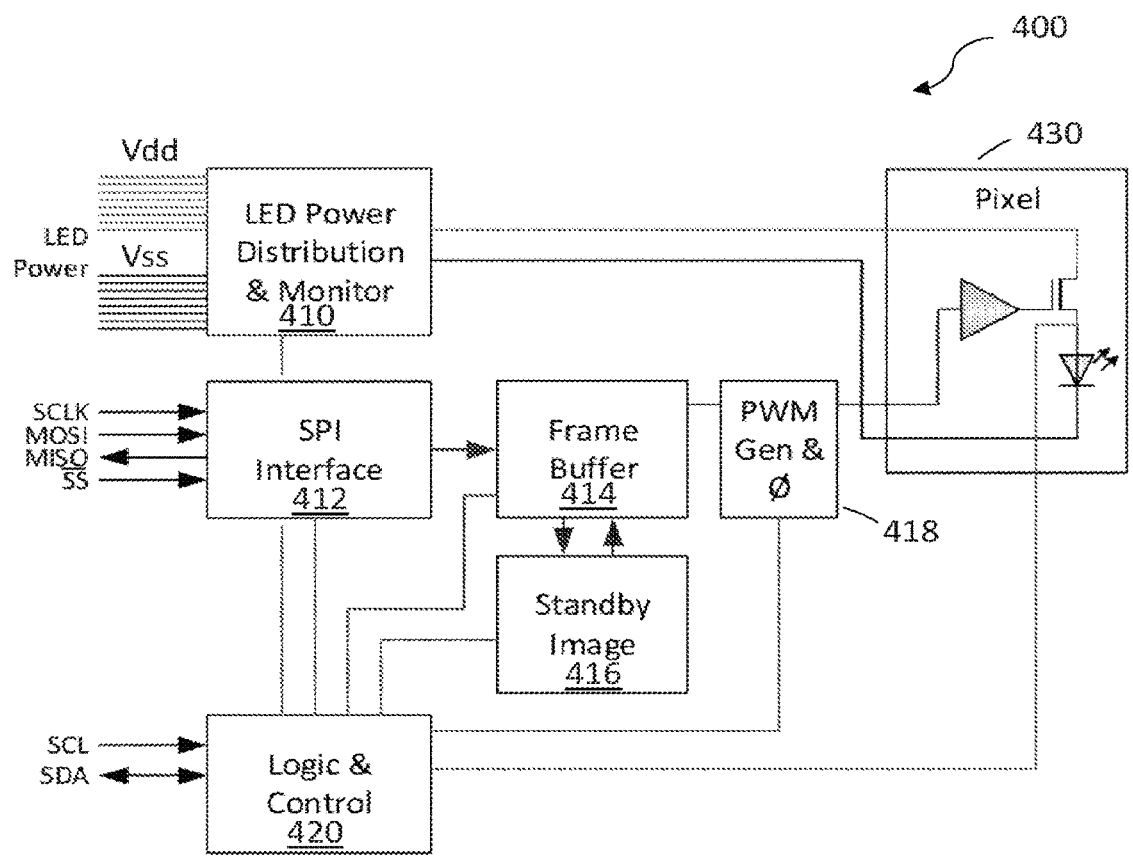
FIG. 4 is a schematic illustration of one embodiment of an active headlamp controller.

FIG. 4 illustrates one embodiment of various components and modules of an active headlamp system 400 such as described with respect to active headlamp 324 of FIG. 3A. As illustrated, internal modules include an LED power distribution and monitor module 410 and a logic and control module 420.

Image or other data from the vehicle can arrive via an SPI interface 412. Successive images or video data can be stored in an image frame buffer 414. If no image data is available, one or more standby images held in a standby image buffer can be directed to the image frame buffer 414. Such standby images can include, for example, an intensity and spatial pattern consistent with legally allowed low beam headlamp radiation patterns of a vehicle.

In operation, pixels in the images are used to define response of corresponding LED pixels in the pixel module 430, with intensity and spatial modulation of LED pixels being based on the image(s). To reduce data rate issues, groups of pixels (e.g. 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical. In conjunction with a pulse width modulation module 418, each pixel in the pixel module can be operated to emit light in a pattern and with an intensity at least partially dependent on the image held in the image frame buffer 414.

In one embodiment, intensity can be separately controlled and adjusted by setting appropriate ramp times and pulse width for each LED pixel using logic and control module 420 and the pulse width modulation module 418. This allows staging of LED pixel activation to reduce power fluctuations, and to provide various pixel diagnostic functionality.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method for providing images to a vehicle headlamp of a vehicle, the method comprising:
   providing power to a headlamp controller via a power bus;
   providing data to the headlamp controller via a data bus;
   providing sensor signals of the vehicle to the headlamp controller from a sensor module via the data bus;
   refreshing image data stored in an image frame buffer of the headlamp controller at a rate of greater than 30 Hz;
   determining whether to provide to a light emitting diode (LED) array default image data stored in a standby image buffer instead of the image data stored in the image frame buffer; and
   projecting light from the LED array, which is coupled to the headlamp controller, according to a pattern and intensity defined by the image frame buffer or standby image frame buffer.

2. The method of claim 1, further comprising identifying an oncoming vehicle and selecting an image to be sent to the headlamp controller using signals from the sensor module.

3. The method of claim 2, further comprising, in response to identifying the oncoming vehicle, the headlamp controller directing the LED array to reduce light emitted toward the oncoming vehicle.

4. The method of claim 1, further comprising the headlamp controller controlling the light projected from the LED array using individual addressing of each pixel in the LED array.

5. The method of claim 1, further comprising the headlamp controller selecting an aspect ratio of the LED array.

6. The method of claim 1, wherein the LED array is positioned in the vehicle adjacent to static LED lighting in the vehicle.

7. The method of claim 1, further comprising the headlamp controller controlling the light projected from the LED array using a pulse width modulator coupled between the image frame buffer and the LED array.

8. The method of claim 7, further comprising setting ramp times and pulse width for each pixel of the LED array using a logic and control module and the pulse width modulator in the headlamp controller to individually control intensity of light emitted from each pixel.

9. The method of claim 8, further comprising staging pixel activation to reduce power fluctuations in the LED array.

10. The method of claim 1, further comprising the headlamp controller controlling groups of pixels of the LED array to control the light emitted by the LED array.

11. An illumination system comprising:
    a controller including:
      an image frame buffer configured to store image frame buffer data, the image frame buffer data configured to be refreshed at a rate greater than 30 Hz, and
      a standby image buffer coupled to the image frame buffer, the standby image buffer configured to store sets of default image data, the controller configured to use one set of default image data in response to a predetermined set of conditions being met; and
    a light emitting diode (LED) array connected to the controller to project light according to a pattern and intensity corresponding to the image frame buffer data or the one set of default image data, pixels of the LED array being individually addressable such that the pixels are selectively controllable individually and in blocks of pixels.

12. The illumination system of claim 11, wherein the controller is coupled to a power and control system through a data bus that provides external image data to the image frame buffer as the image frame buffer data, the external image data being used by the LED array to project the light in response to the predetermined set of conditions not being met.

13. The illumination system of claim 11, wherein:
    the controller is coupled to a power and control system through a data bus that provides sensor signals from an external sensor module, and
    the controller is configured to identify positions of objects within a range of illumination of the LED array based on the sensor signals and determine from the positions whether the predetermined set of conditions have been met.

14. The illumination system of claim 13, wherein:
    the controller is configured to control the image frame buffer and standby image frame buffer to load the one set of default image data in response to a determination that the object is a vehicle, and
    the LED array is configured to emit light that corresponds to a legally allowed low beam headlamp radiation pattern in response to being driven using the one set of default image data.

15. The illumination system of claim 11, wherein the controller is configured to select an aspect ratio of the LED array based on the predetermined set of conditions.

16. The illumination system of claim 15, wherein the LED array is positioned adjacent to static LED lighting that is configured to emit light independent of the predetermined set of conditions.

17. The illumination system of claim 11, wherein:
    the controller further comprises a pulse width modulator coupled to the image frame buffer and the LED array,
    the pulse width modulator is configured to drive the LED array based on the image frame buffer data from the image frame buffer, and
    the controller is configured to separately control intensity of light emitted by each pixel by setting ramp times and pulse width of a pulse from the pulse width modulator independently for each pixel.

18. A compound semiconductor metal oxide (CMOS) backplane comprising:
    a processor;
    an image frame buffer configured to store image frame buffer data, the image frame buffer data configured to be refreshed at a rate greater than 30 Hz and controlled by the processor;
    a standby image buffer coupled to the image frame buffer, the standby image buffer configured to store sets of default image data, the processor configured to control the image frame buffer and the standby image buffer to provide the image frame buffer data from the image frame buffer based on a determination of whether at least one object is within a range of illumination of an light emitting diode (LED) array, the image frame buffer data selected between external image data received at the image frame buffer and one of the sets of the default image data sent to the image frame buffer from the standby image frame buffer, selection of the one of the sets of the default image data and transmission of the one of the sets of the default image data controlled by the processor; and a pulse width modulator coupled to the image frame buffer and the processor, the pulse width modulator configured to drive the LED array to emit an image based on the image frame buffer data from the image frame buffer.

19. The CMOS backplane of claim 18, wherein the processor is configured to separately control intensity of light emitted by each pixel of the LED array by setting ramp times and pulse width of a pulse from the pulse width modulator independently for each pixel.

20. The CMOS backplane of claim 18, wherein the controller is configured to control the image frame buffer and standby image frame buffer to load the one set of default image data in response to a determination that the object is a vehicle, and the one set of default image data corresponds to emission by the LED array of a legally allowed low beam headlamp radiation pattern in response to being driven using the one set of default image data.

\* \* \* \* \*

UNITED STATES PATENT AND TRADEMARK OFFICE
CERTIFICATE OF CORRECTION

| | |
|---|---|
| PATENT NO. | : 11,607,989 B2 |
| APPLICATION NO. | : 17/338362 |
| DATED | : March 21, 2023 |
| INVENTOR(S) | : Bonne et al. |

It is certified that error appears in the above-identified patent and that said Letters Patent is hereby corrected as shown below:

In the Claims

In Column 8, Line 55, in Claim 18, delete "compound semiconductor metal oxide" and insert --complementary metal oxide semiconductor-- therefor Signed and Sealed this
Thirtieth Day of May, 2023

Katherine Kelly Vidal
*Director of the United States Patent and Trademark Office*